US012597799B2

(12) United States Patent
Huang et al.

(10) Patent No.: US 12,597,799 B2
(45) Date of Patent: Apr. 7, 2026

(54) POWER SUPPLY SWITCHING METHOD AND APPARATUS, AND MULTI-POWER SUPPLY SYSTEM

(71) Applicant: Gree Electric Appliances, Inc. of Zhuhai, Zhuhai (CN)

(72) Inventors: Meng Huang, Zhuhai (CN); Zhiguo Xu, Zhuhai (CN); Yingyi Jiang, Zhuhai (CN); Pengliang Fu, Zhuhai (CN); Chunyang Song, Zhuhai (CN); Yusheng Qi, Zhuhai (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 204 days.

(21) Appl. No.: 18/690,986

(22) PCT Filed: Jul. 26, 2022

(86) PCT No.: PCT/CN2022/107802
§ 371 (c)(1),
(2) Date: Mar. 11, 2024

(87) PCT Pub. No.: WO2023/056772
PCT Pub. Date: Apr. 13, 2023

(65) Prior Publication Data
US 2024/0388126 A1      Nov. 21, 2024

(30) Foreign Application Priority Data

Oct. 9, 2021    (CN) .......................... 202111178301.X

(51) Int. Cl.
*H02J 9/06*        (2006.01)
*H02M 7/5387*      (2007.01)

(52) U.S. Cl.
CPC .............. *H02J 9/062* (2013.01); *H02J 9/068* (2020.01); *H02M 7/53871* (2013.01)

(58) Field of Classification Search
CPC .... H02J 9/062; H02J 9/068; H02J 9/06; H02J 9/061; H02J 1/10; H02J 7/34; H02J 7/345; H02M 5/4585; H02M 1/10
See application file for complete search history.

(56) References Cited

U.S. PATENT DOCUMENTS 9,093,859 B2 * 7/2015 Hock ...................... H02J 9/061
2002/0198648 A1 12/2002 Gilbreth et al.
(Continued)

FOREIGN PATENT DOCUMENTS

CN    103915891 A    7/2014
CN    110323824 A    10/2019
(Continued)

OTHER PUBLICATIONS

EP 22877796, Extended European Search Report, Jan. 8, 2025.
International Search Report, PCT/CN2022/107802, Sep. 22, 2022.
Written Opinion, PCT/CN2022/107802, Sep. 19, 2022.

*Primary Examiner* — Rexford N Barnie
*Assistant Examiner* — Rasem Mourad
(74) *Attorney, Agent, or Firm* — The Webb Law Firm

(57) ABSTRACT

A power supply switching method and apparatus, and a multi-power supply system. The method is applied to a multi-power supply system which includes an alternating-current power supply, a direct-current power supply and an energy storage power supply. The method includes obtaining a power supply switching instruction, wherein the power supply switching instruction includes a power supply switching direction; and controlling, according to the power supply switching direction, the energy storage power supply to perform a voltage transition in the power supply switching process.

17 Claims, 4 Drawing Sheets

(56)  References Cited

U.S. PATENT DOCUMENTS

| | | | | |
|---|---|---|---|---|
| 2010/0066431 | A1* | 3/2010 | Carter | H02J 9/061 |
| | | | | 327/408 |
| 2015/0109708 | A1* | 4/2015 | Cheng | H02H 9/025 |
| | | | | 361/93.9 |
| 2018/0278180 | A1 | 9/2018 | Toyoda | |
| 2019/0027959 | A1* | 1/2019 | Lee | H02J 9/061 |
| 2021/0194272 | A1 | 6/2021 | Begino, III et al. | |
| 2022/0158485 | A1* | 5/2022 | Xu | H02M 1/4208 |

FOREIGN PATENT DOCUMENTS

| | | | |
|---|---|---|---|
| CN | 210780230 | U | 6/2020 |
| CN | 212114875 | U | 12/2020 |
| CN | 213783131 | U | 7/2021 |
| CN | 113890174 | A | 1/2022 |
| JP | 2005227017 | A | 8/2005 |
| WO | 2023056772 | A1 | 4/2023 |

* cited by examiner

Obtain a power supply switching instruction, wherein
the power supply switching instruction comprises a
power supply switching direction          S101

Control, according to the power supply switching
direction, the energy storage power supply to perform
a voltage transition in a power supply switching
process          S102

POWER SUPPLY SWITCHING METHOD AND APPARATUS, AND MULTI-POWER SUPPLY SYSTEM

CROSS-REFERENCE TO RELATED APPLICATIONS

This application is the United States National Phase of International Patent Application No. PCT/CN2022/107802, filed Jul. 26, 2022, and claims priority to Chinese Patent Application No. 202111178301.X, filed Oct. 9, 2021, the disclosures of which are hereby incorporated by reference in their entireties.

BACKGROUND OF THE INVENTION

Field of the Invention

The present disclosure relates to a power supply switching method, apparatus, and multi-power supply system.

Description of Related Art

In the related art, multi-power supply systems (such as alternating-current/direct-current hybrid power supply frequency converters) involve switching of power supply. For example, direct-current power supply can be switched to alternating-current power supply, or alternating-current power supply can be switched to direct-current power supply.

SUMMARY OF THE INVENTION

According to an aspect of the present disclosure, a power supply switching method applied to a multi-power supply system is provided, wherein the multi-power supply system comprises an alternating-current power supply, a direct-current power supply, and an energy storage power supply, and the method comprises: obtaining a power supply switching instruction, wherein the power supply switching instruction comprises a power supply switching direction; and controlling, according to the power supply switching direction, the energy storage power supply to perform a voltage transition in a power supply switching process.

According to another aspect of the present disclosure, a power supply switching apparatus applied to a multi-power supply system is provided, wherein the multi-power supply system comprises an alternating-current power supply, a direct-current power supply, and an energy storage power supply, and the power supply switching apparatus comprises: an instruction obtaining module configured to obtain a power supply switching instruction, wherein the power supply switching instruction comprises a power supply switching direction; and an execution module configured to control, according to the power supply switching direction, the energy storage power supply to perform a voltage transition in a power supply switching process to reduce a direct-current bus voltage fluctuation in the power supply switching process.

According to another aspect of the present disclosure, a power supply switching apparatus applied to a multi-power supply system is provided, wherein the multi-power supply system comprises an alternating-current power supply, a direct-current power supply, and an energy storage power supply, and the power supply switching apparatus comprises: a memory; and a processor coupled to the memory, wherein the processor is configured to, based on instructions stored in the memory, perform the method described above.

According to another aspect of the present disclosure, a multi-power supply system is provided, the multi-power supply system comprising an alternating-current power supply, a direct-current power supply, an energy storage power supply, and the power supply switching apparatus described above.

According to another aspect of the present disclosure, there is provided a computer-readable storage medium stored thereon a computer program that, when executed by a processor, implements the power supply switching method described above.

According to another aspect of the present disclosure, there is provided a computer program, comprising: instructions that, when executed by a processor, cause the processor to perform the method described above.

According to another aspect of the present disclosure, there is provided a computer program product comprising instructions that, when executed by a processor, cause the processor to perform the method described above.

BRIEF DESCRIPTION OF THE DRAWINGS

The accompanying drawings, which constitute a portion of this specification, illustrate embodiments of the present disclosure and, together with the description, serve to explain the principles of the present disclosure.

The present disclosure will be more clearly understood from the following detailed description with reference to the accompanying drawings, in which.

Figures 1, 2:
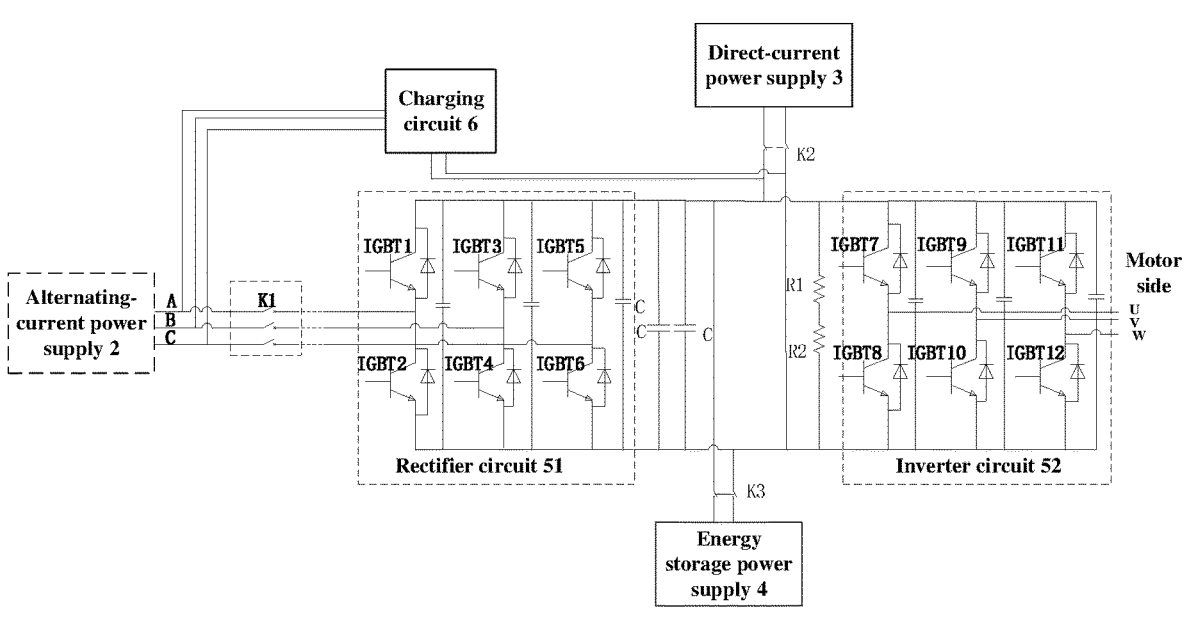
FIG. 1 is a diagram showing a circuit structure of a multi-power supply system according to some embodiments of the present disclosure.
FIG. 2 is a flowchart of a power supply switching method according to some embodiments of the present disclosure.

It should be understood that the dimensions of the various parts shown in the drawings are not necessarily drawn to the actual scale. In addition, the same or similar reference signs are used to denote the same or similar components.

DESCRIPTION OF THE INVENTION

In order to make objectives, technical solutions and advantages of the present disclosure more clear, the present disclosure will be further described in detail with reference to the accompanying drawings. Obviously, the embodiments described are only a portion of the embodiments of the present disclosure, and not all embodiments. All other embodiments obtained by those of ordinary skill in the art based on the embodiments of the present disclosure without creative efforts shall fall within the protection scope of the present disclosure.

The terms used in the embodiments of the present disclosure are only for the purpose of describing specific examples, but are not intended to limit the present disclosure. The singular forms of "a", "said" and "the" as used in the present disclosure and in the appended claims are also intended to comprise the plural forms, unless the context clearly dictates otherwise. The expression "multiple" generally comprises at least two.

It should be understood that the term "and/or" as used herein is simply a description of the association of related objects, indicating that there may be three possible relationships of the related objects, for example, A and/or B can indicate the presence of A alone, the presence of both A and B, and the presence of B alone. In addition, the character "/" in this description generally indicates that the objects associated before and after "/" have an "or" relationship.

It should be understood that although the terms "first", "second", "third", and the like may be used to describe preset durations in the embodiments of the present disclosure, these preset durations should not be limited by these terms. These terms are only used to distinguish different preset durations. For example, without departing from the scope of the embodiments of the present disclosure, a first preset duration can also be referred to as a third preset duration, and similarly, a third preset duration can also be referred to as a first preset duration.

Depending on the context, the word "if" as used herein can be interpreted as "when" or "in response to determination" or "in response to detection". Similarly, depending on the context, the phrase "if it is determined" or "if (stated condition or event) is detected" can be interpreted as "when it is determined" or "in response to determination" or "when (stated condition or event) is detected" or "in response to detection of (stated condition or event)".

It should also be noted that terms "comprise", "include" or their any other variations are intended to encompass non-exclusive composition, so that a product or device comprising a series of factors may comprise not only these factors, but also other factors that are not listed explicitly, or factors intrinsic to this product or device. Without further limitation, a factor defined by wording "comprise one . . . " does not exclude the existence of other same factors in a product or device comprising such factor.

The inventors of the present disclosure have found that during the power supply switching process of a multi-power supply system, when switching from direct-current power supply to alternating-current power supply, a bus voltage may suddenly drop, causing a significant decrease in the speed of a backward stage motor, and in some severe cases a motor shutdown; when switching from alternating-current to direct-current power supply, a direct-current bus voltage suddenly rises, which is easy to produce a large surge current, resulting in damage to bus capacitors. In addition, other electronic components in the system may also be affected by the voltage/current surges, thereby affecting their lifetime. In summary, whether switching from direct-current power supply to alternating-current power supply or from alternating-current power supply to direct-current power supply, it may cause significant fluctuations in the bus voltage in a short period of time, thereby affecting the stable operation of the system.

In view of this, some embodiments of the present disclosure provide a power supply switching method for solving the problem in the related art that the direct-current bus voltage fluctuates significantly in a short period of time during the power supply switching process of a multi-power supply system, thereby adversely affecting the stable operation of the system.

Below, optional embodiments of the present disclosure will be described with reference to the drawings.

In some embodiments of the present disclosure, a power supply switching method applied to a multi-power supply system is provided. FIG. 1 is a diagram showing a circuit structure of a multi-power supply system according to some embodiments of the present disclosure. As shown in FIG. 1, the multi-power supply system comprises an alternating-current power supply 2, a direct-current power supply 3, an energy storage power supply 4, and further comprises a rectifier circuit 51 composed of IGBT1 to IGBT6, and an inverter circuit 52 composed of IGBT7 to IGBT12. Two direct-current buses are connected between the rectifier circuit 51 and the inverter circuit 52. A plurality of bus capacitors C, as well as a first resistor R and a second resistor R2 connected in series, are connected between the two direct-current buses. A first switch K1 is provided between the alternating-current power supply 2 and the rectifier circuit 51, wherein the first switch K1 is configured to control the on-off of the alternating-current power supply 2. The direct-current power supply 3 is connected to the above direct-current bus via a second switch K2, and the on-off of the direct-current power supply 3 is controlled by the on or off of the second switch K2. The energy storage power supply 4 is connected to the above direct-current bus via a third switch K3, and the on-off of the energy storage power supply 4 is controlled by the on or off of the third switch K3.

The above multi-power supply system further comprises a charging circuit 6, wherein the charging circuit 6 is provided between the alternating-current power supply 2 and the direct-current bus, and configured to charge the bus capacitors C between the two direct-current buses to increase the direct-current bus voltage. One end of the inverter circuit 52 is connected to the rectifier circuit 51, and another end of the inverter circuit 52 is connected to a motor.

In the above multi-power supply system, when the power supply is switched from the direct-current power supply 3 to the alternating-current power supply 2, the bus voltage suddenly drops, which reduces the rotational speed of the rear motor by a large margin and leads to motor shutdown; when the power supply is switched from the alternating-current power supply 2 to the direct-current power supply 3, the direct-current bus voltage suddenly increases, which tends to generate a large surge current, resulting in damage to the bus capacitors C. Moreover other electronic components in the system are also affected by the voltage/current surge, which may affect their service life. In summary, whether switching from the direct-current power supply 3 to the alternating-current power supply 2, or from the alternating-current power supply 2 to the direct-current power supply 3, it may cause significant fluctuations in the bus voltage in a short period of time, thereby affecting the stable operation of the system.

In view of this, the embodiments provide a power supply switching method. FIG. 2 is a flowchart of a power supply switching method according to some embodiments of the present disclosure. As shown in FIG. 2, the method comprises steps S101 to S102.

In step S101, a power supply switching instruction is obtained, wherein the power supply switching instruction comprises a power supply switching direction.

In a specific implementation, the power supply switching direction comprises switching from alternating-current power supply to direct-current power supply, and switching from the direct-current power supply to the alternating-current power supply. The above power supply switching instruction can come from a user operation, or a condition for the power supply switching can be set in advance. When the condition is met, a power supply switching instruction is automatically generated.

In step S102, the energy storage power supply is controlled to perform a voltage transition in a power supply switching process according to the power supply switching direction.

For example, in a case of switching from the alternating-current power supply to the direct-current power supply, the energy storage power supply is controlled to perform transition from a low voltage to a high voltage during the power supply switching process; in a case of switching from the direct-current power supply to the alternating-current power supply, the energy storage power supply is controlled to perform transition from a high voltage to a low voltage during the power supply switching process, thereby reducing direct-current bus voltage fluctuation during the power supply switching process.

In the power supply switching method of the embodiment, when the power supply switching is performed, according to the direction of the power supply switching, the energy storage power supply is controlled to perform the voltage transition in the power supply switching process to reduce the direct-current bus voltage fluctuation in the power supply switching process, thereby achieving flexible switching of power supply, reducing the possibility of a large fluctuation of the direct-current bus voltage in a short period of time in the power supply switching process, and allowing the multi-power supply system to operate stably as much as possible.

In some embodiments of the present disclosure, another power supply switching method is provided. In order to reduce the possibility of a significant increase in the bus voltage in a short period of time when switching from the alternating-current power supply to the direct-current power supply, if the power supply switching direction is switching from the alternating-current power supply to the direct-current power supply, the controlling of the energy storage power supply to perform the voltage transition in the power supply switching process comprises: after obtaining the power supply switching instruction, controlling the energy storage power supply to be switched on and perform the voltage transition; after the voltage transition is completed, controlling the direct-current power supply to be switched on; and after continuing for a first preset duration, a supply voltage of the direct-current power supply reaching a stable state, controlling the energy storage power supply to be switched off.

In some embodiments, in order to make the direct-current bus voltage rise smoothly, the controlling of the energy storage power supply to be switched on and perform the voltage transition comprises: controlling the energy storage power supply to be switched on and controlling a power supply voltage of the energy storage power supply to be a first preset voltage, wherein the first preset voltage is less than a preset direct-current bus voltage; and controlling the power supply voltage output by the energy storage power supply to gradually increase to a second preset voltage according to a preset step, wherein the second preset voltage is greater than the preset direct-current bus voltage and less than a power supply voltage of the direct-current power supply. The above operation makes the voltage rise slowly when the power supply is switched from the alternating-current power supply to the direct-current power supply by means of the transitional effect of the energy storage power supply.

In some embodiments, the above multi-power supply system further comprises a rectifier circuit. In order to reduce feedback of the direct-current bus voltage to the power grid (i.e., the alternating-current power supply 2), after controlling the energy storage power supply to be switched on and perform the voltage transition, the above method further comprises: switching off a rectification control signal of the rectifier circuit after a second preset duration to cause the rectifier circuit to be in an uncontrolled rectification state, and performing rectification by a diode in an IGBT switching tube of the rectifier circuit.

When switching from the alternating-current power supply to the direct-current power supply, the bus voltage rises significantly in a short period of time. On the contrary, when switching from the direct-current power supply to the alternating-current power supply, the direct-current bus voltage decreases significantly in a short period of time, which in some severe cases may cause a motor shutdown. In order to reduce the possibility that the direct-current bus voltage decreases significantly in a short period of time, if the power supply switching direction is switching from the direct-current power supply to the alternating-current power supply, the controlling of the energy storage power supply to perform the voltage transition in the power supply switching process comprises: after obtaining the power supply switching instruction, controlling the energy storage power supply to be switched on and controlling a power supply voltage of the energy storage power supply to be a third preset voltage, wherein the third preset voltage is less than a preset direct-current bus voltage, so that a first step of voltage reduction is completed; after continuing for a third preset duration, wherein the direct-current bus voltage has reached a stable state, controlling the direct-current power supply to be switched off and controlling the energy storage power supply to perform the voltage transition, so that a second step of voltage reduction is completed; and after completing a fourth preset duration of the voltage transition, wherein the direct-current bus voltage has reached the stable state, controlling the energy storage power supply to be switched off.

In some embodiments, in order to make the direct-current bus voltage transition slowly, the controlling of the energy storage power supply to perform the voltage transition comprises: controlling the power supply voltage of the energy storage power supply to gradually decrease to a fourth preset voltage according to a preset step, wherein the fourth preset voltage is greater than an uncontrolled rectification voltage value of the multi-power supply system, the uncontrolled rectification voltage value being an effective voltage value output by a rectifier circuit in the multi-power supply system after a rectification control signal of the rectifier circuit is switched off. The above operation makes the voltage decrease slowly when the power supply is switched from the direct-current power supply to the alternating-current power supply by means of the transitional effect of the energy storage power supply.

Before obtaining and executing the power supply switching instruction, it makes it possible for the multi-power supply system to be in a normal operating state, that is, each power supply can supply power normally. Therefore, in some embodiments, before obtaining the power supply switching instruction, the above method further comprises: detecting whether the multi-power supply system has a fault; if so, entering a fault handling procedure; and if not, controlling a predetermined power supply to be switched on and then triggering obtaining of the power supply switching instruction.

Figure 3:
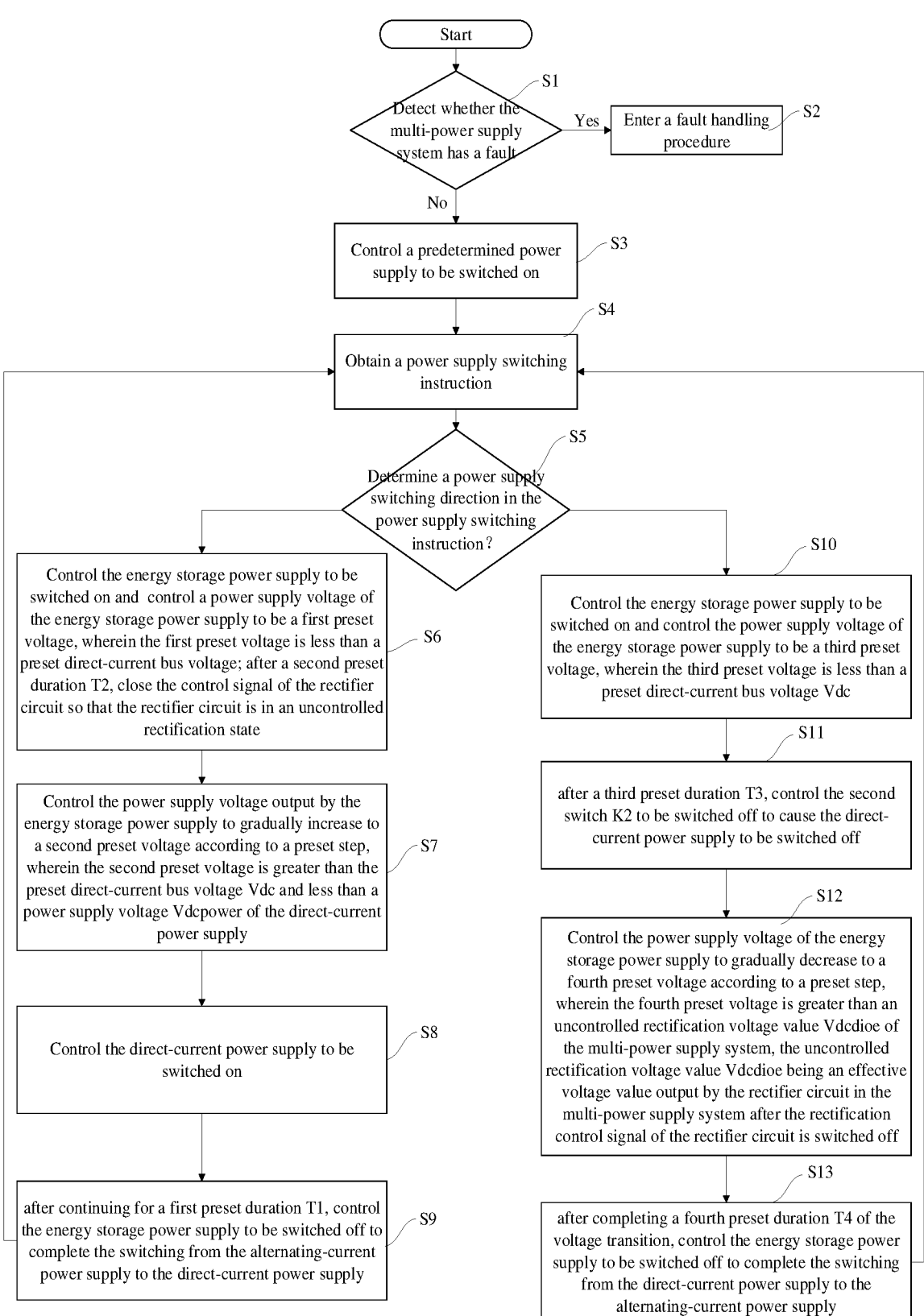
FIG. 3 is a flowchart of a power supply switching method according to other embodiments of the present disclosure.

FIG. 3 is a flowchart of a power supply switching method according to other embodiments of the present disclosure. As shown in FIG. 3, the method comprises steps S1 to S13.

In step S1, whether the multi-power supply system has a fault is detected; if so, step S2 is performed; otherwise, step S3 is performed.

In step S2, a fault handling procedure is entered.

In step S3, a predetermined power supply is controlled to be switched on, and then step S4 is triggered.

When whether the alternating-current power supply has a fault is detected, it is detected whether the amplitude and frequency of the voltage fluctuation of the power grid are normal. If normal, it indicates that the alternating-current power supply can operate normally, if abnormal, it indicates a fault has occurred and a corresponding fault handling procedure is entered. If normal, a predetermined power supply is controlled to be switched on. When detecting whether the direct-current power supply has a fault, it is determined whether overvoltage or undervoltage occurs, as well as the abnormality such as a large voltage fluctuation. If so, a fault handling procedure is entered; otherwise, a predetermined power supply is controlled to be switched on. For example, if it is predetermined that power is to be supplied from the alternating-current power supply, the alternating-current power supply is controlled to be switched on, that is, the first switch K1 is controlled to be closed, the rectifier circuit is started, the direct-current bus voltage is adjusted to a preset direct-current bus voltage Vdc (for example, the direct-current bus voltage Vdc=600V), and the second switch K2 and the third switch K3 are opened, and if it is predetermined that power is to be supplied from the direct-current power supply, the second switch K2 is controlled to be closed, the first switch K1 is closed, the control signal of the rectifier circuit is closed so that the rectifier circuit is in the uncontrolled rectification state, and the third switch K1 is opened and then step S4 is triggered.

In step S4, a power supply switching instruction is obtained.

In step S5, a power supply switching direction in the power supply switching instruction is determined. If the power supply switching direction is switching from the alternating-current power supply to the direct-current power supply, step S6 is performed. If the power supply switching direction is switching from the direct-current power supply to the alternating-current power supply, step S10 is performed.

In step S6, the energy storage power supply is controlled to be switched on and a power supply voltage of the energy storage power supply is controlled to be a first preset voltage, wherein the first preset voltage is less than a preset direct-current bus voltage; after a second preset duration T2, the control signal of the rectifier circuit is closed so that the rectifier circuit is in an uncontrolled rectification state.

In step S7, the power supply voltage output by the energy storage power supply is controlled to gradually increase to a second preset voltage according to a preset step, wherein the second preset voltage is greater than the preset direct-current bus voltage Vdc and less than a power supply voltage Vdcpower of the direct-current power supply.

In step S8, the direct-current power supply is controlled to be switched on.

In step S9, after continuing for a first preset duration T1, the energy storage power supply is controlled to be switched off to complete the switching from the alternating-current power supply to the direct-current power supply, and then the method returns to step S4.

For example, in a specific implementation, when it is determined that the power supply switching direction is switching from the alternating-current power supply to the direct-current power supply, the third switch K3 is controlled to be closed to cause the energy storage power supply to be switched on, and to output a power supply voltage Vst=0.99Vdc; after a second preset duration T2, rectification control is switched off and the rectifier circuit is in an uncontrolled rectification state, allowing the direct-current bus voltage to not interfere with the alternating-current power grid due to feeding back into the alternating-current power grid. The energy storage power supply voltage Vst is controlled to slowly rise to 0.99*the direct-current power supply voltage Vdcpower (for example, the direct-current power supply voltage Vdcpower=750V), then the second switch K2 is controlled to be closed to cause the direct-current power supply to be switched on. After a first preset duration T1, the third switch K3 is controlled to be opened, so that a direct-current power supply mode is entered.

In step S10, the energy storage power supply is controlled to be switched on and the power supply voltage of the energy storage power supply is controlled to be a third preset voltage, wherein the third preset voltage is less than a preset direct-current bus voltage Vdc.

In step S11, after a third preset duration T3, the second switch K2 is controlled to be switched off to cause the direct-current power supply to be switched off.

In step S12, the power supply voltage of the energy storage power supply is controlled to gradually decrease to a fourth preset voltage according to a preset step, wherein the fourth preset voltage is greater than an uncontrolled rectification voltage value Vdcdioe of the multi-power supply system, the uncontrolled rectification voltage value Vdcdioe being an effective voltage value output by the rectifier circuit in the multi-power supply system after the rectification control signal of the rectifier circuit is switched off.

In step S13, after completing a fourth preset duration T4 of the voltage transition, the energy storage power supply is controlled to be switched off to complete the switching from the direct-current power supply to the alternating-current power supply, and then the method returns to step S4.

For example, in a specific implementation, after it is determined that the power supply switching direction is switching from the direct-current power supply to the alternating-current power supply, first, the third switch K3 is controlled to be closed to output a supply voltage Vst=0.99*the preset direct-current bus voltage Vdc. After a third preset duration T3, the second switch K2 is controlled to be opened, and the supply voltage Vst of the energy storage power supply is controlled at the same time to slowly decrease to a fourth preset voltage V4, wherein the fourth preset voltage V4=1.1*the uncontrolled rectification voltage value Vdcdioe (for example, the uncontrolled rectification voltage value Vdcdioe=537V). After a preset duration T4, the third switch K3 is controlled to be opened, so that an alternating-current power supply mode is entered.

The power supply switching method of this embodiment can achieve a flexible transition of the bus voltage during the process of alternating-current/direct-current power switching, so that the reliability of the multi-power supply system can be improved, and the effect of current surges on the components during power supply switching can be reduced, thereby improving the service life of the components, and the manpower and material costs of frequent component replacement can be reduced.

Figure 4:
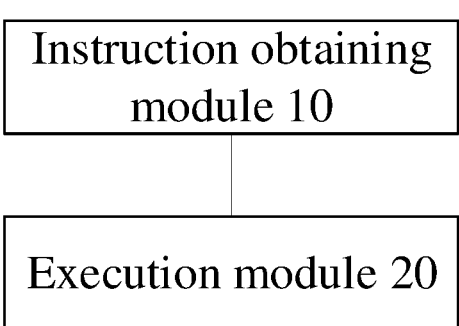
FIG. 4 is a structural diagram of a power supply switching apparatus according to some embodiments of the present disclosure.

In some embodiments of the present disclosure, a power supply switching apparatus is provided. FIG. 4 is a structural diagram of a power supply switching apparatus according to some embodiments of the present disclosure. As shown in FIG. 4, the apparatus comprises an instruction obtaining module 10 and an execution module 20.

The instruction obtaining module 10 is configured to obtain a power supply switching instruction, wherein the power supply switching instruction comprises a power supply switching direction.

For example, in a specific implementation, the power supply switching direction comprises switching from alternating-current power supply to direct-current power supply, and switching from the direct-current power supply to the alternating-current power supply. The above power supply switching instruction can come from a user operation, or a condition for the power supply switching can be set in advance. When the condition is met, a power supply switching instruction is automatically generated.

The execution module 20 is configured to control, according to the power supply switching direction, the energy storage power supply to perform a voltage transition in a power supply switching process.

For example, in a case of switching from the alternating-current power supply to the direct-current power supply, the energy storage power supply is controlled to perform transition from a low voltage to a high voltage during the power supply switching process; in a case of switching from the direct-current power supply to the alternating-current power supply, the energy storage power supply is controlled to perform transition from a high voltage to a low voltage during the power supply switching process, thereby reducing direct-current bus voltage fluctuation during the power supply switching process.

In the power supply switching apparatus of the embodiment, when the power supply switching is performed, the execution module 20 controls, according to the direction of the power supply switching, the energy storage power supply to perform the voltage transition in the power supply switching process to reduce the direct-current bus voltage fluctuation in the power supply switching process, thereby achieving flexible switching of power supply, reducing the possibility of the large fluctuation of the direct-current bus voltage in a short period of time in the power supply switching process, and making the multi-power supply system operate stably.

Figure 5:
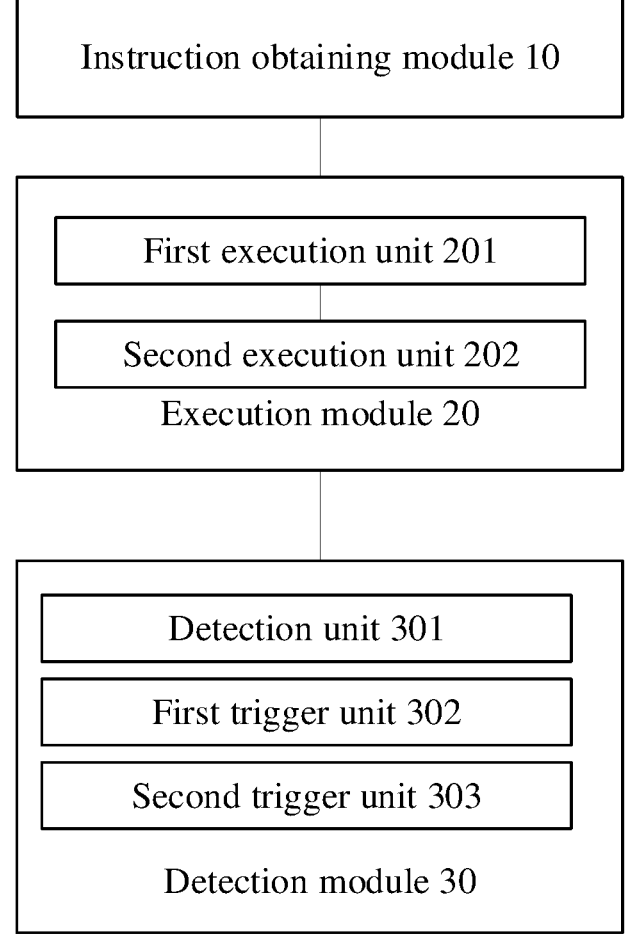
FIG. 5 is a structural diagram of a power supply switching apparatus according to other embodiments of the present disclosure.

In some embodiments of the present disclosure, another power supply switching apparatus is provided. FIG. 5 is a structural diagram of a power supply switching apparatus according to other embodiments of the present disclosure. As shown in FIG. 5, in order to reduce the possibility of a significant increase in the bus voltage in a short period of time when switching from the alternating-current power supply to the direct-current power supply, the execution module 20 described above comprises: a first execution unit 201 configured to, if the power supply switching direction is switching from the alternating-current power supply to the direct-current power supply, control the energy storage power supply to be switched on and perform the voltage transition, after the voltage transition is completed, control the direct-current power supply to be switched on, and after continuing for a first preset duration, a supply voltage of the direct-current power supply reaching a stable state, control the energy storage power supply to be switched off.

In some embodiments, in order to make the direct-current bus voltage rise smoothly, the controlling of the energy storage power supply to be switched on and perform the voltage transition comprises: controlling the energy storage power supply to be switched on and controlling a power supply voltage of the energy storage power supply to be a first preset voltage, wherein the first preset voltage is less than a preset direct-current bus voltage; and controlling the power supply voltage output by the energy storage power supply to gradually increase to a second preset voltage according to a preset step, wherein the second preset voltage is greater than the preset direct-current bus voltage and less than a power supply voltage of the direct-current power supply.

In some embodiments, the above multi-power supply system further comprises a rectifier circuit. In order to reduce feedback of the direct-current bus voltage to the power grid, the first execution unit 201 is further configured to: after controlling the energy storage power supply to be switched on and perform the voltage transition for a second preset duration, switch off a rectification control signal of the rectifier circuit to cause the rectifier circuit to be in an uncontrolled rectification state, and perform rectification by a diode in an IGBT switching tube of the rectifier circuit.

When switching from the alternating-current power supply to the direct-current power supply, the bus voltage rises significantly in a short period of time. On the contrary, when switching from the direct-current power supply to the alternating-current power supply, the direct-current bus voltage decreases significantly in a short period of time, which in some severe cases may cause a motor shutdown. Thus, in some embodiments, in order to reduce the possibility that the direct-current bus voltage decreases significantly in a short period of time, the above execution module 20 further comprises: a second execution unit 202 configured to, if the power supply switching direction is switching from the direct-current power supply to the alternating-current power supply, control the energy storage power supply to be switched on and control a power supply voltage of the energy storage power supply to be a third preset voltage, wherein the third preset voltage is less than a preset direct-current bus voltage, so that a first step of voltage reduction is completed, after continuing for a third preset duration, wherein the direct-current bus voltage has reached a stable state, control the direct-current power supply to be switched off and control the energy storage power supply to perform the voltage transition, so that a second step of voltage reduction is completed, and after completing a fourth preset duration of the voltage transition, wherein the direct-current bus voltage has reached the stable state, control the energy storage power supply to be switched off.

In some embodiments, in order to make the direct-current bus voltage transition slowly, the controlling of the energy storage power supply to perform the voltage transition comprises: controlling the power supply voltage of the energy storage power supply to gradually decrease to a fourth preset voltage according to a preset step, wherein the fourth preset voltage is greater than an uncontrolled rectification voltage value of the multi-power supply system, the uncontrolled rectification voltage value being an effective voltage value output by a rectifier circuit in the multi-power supply system after a rectification control signal of the rectifier circuit is switched off.

In some embodiments, before obtaining and executing the power supply switching instruction, it makes it possible for the multi-power supply system to be in a normal operating state, that is, each power supply can supply power normally.

Thus, the above power supply switching apparatus further comprises a detection module 30. The detection module 30 comprises: a detection unit 301 configured to detect whether the multi-power supply system has a fault; a first trigger unit 302 configured to trigger entry into a fault handling procedure when the multi-power supply system has a fault; a second trigger unit 303 configured to control a predetermined power supply to be switched on and then trigger obtaining of the power supply switching instruction when the multi-power supply system has no fault.

In other embodiments of the present disclosure, a power supply switching apparatus applied to a multi-power supply system is provided. The multi-power supply system comprises an alternating-current power supply, a direct-current power supply, and an energy storage power supply. The power supply switching apparatus comprises: a memory; a processor coupled to the memory, the processor is configured to, based on instructions stored in the memory, perform the method described above.

Figure 7:
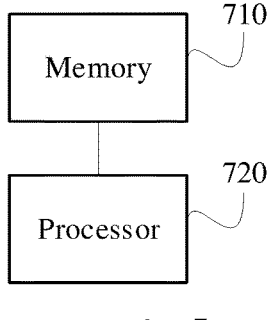
FIG. 7 is a structural diagram of a power supply switching apparatus according to other embodiments of the present disclosure.

FIG. 7 is a structural diagram of a power supply switching apparatus according to other embodiments of the present disclosure. The power supply switching apparatus comprises a memory 710 and a processor 720.

The memory 710 is a magnetic disk, flash memory or any other non-volatile storage medium. The memory is configured to store instructions in the embodiments shown corresponding to FIG. 2 and/or FIG. 3.

The processor 720 is coupled to the memory 710 and may be implemented as one or more integrated circuits, such as a microprocessor or microcontroller. The processor 720 is configured to execute the instructions stored in the memory, so as to reduce the direct-current bus voltage fluctuation during the power supply switching process, thereby achieving flexible power switching, reducing the possibility of a large fluctuation of the direct-current bus voltage in a short period of time during the power supply switching process, and making the multi-power supply system operate stably.

Figure 6:
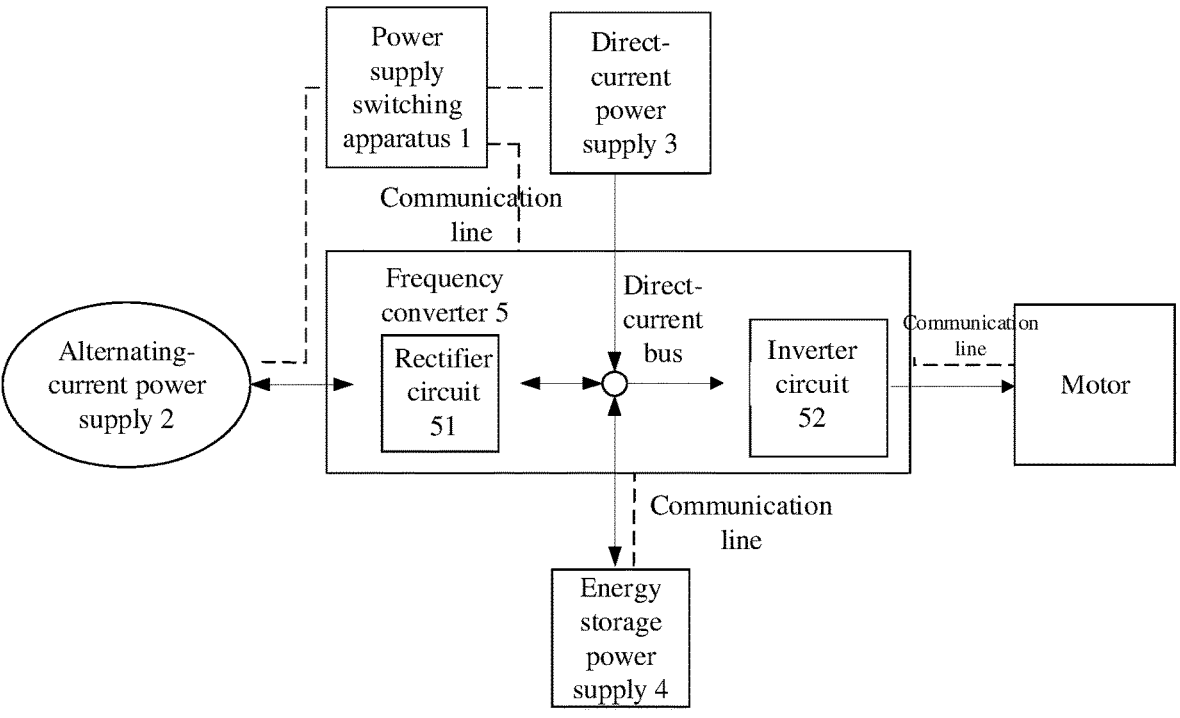
FIG. 6 is a block diagram of a structure of a multi-power supply system according to some embodiments of the present disclosure.

In some embodiments of the present disclosure, a multi-power supply system is provided. FIG. 6 is a block diagram of a structure of a multi-power supply system according to some embodiments of the present disclosure. As shown in FIG. 6, the multi-power supply system comprises: an alternating-current power supply 2, a direct-current power supply 3, an energy storage power supply 4, a frequency converter 5 composed of a rectifier circuit 51 and an inverter circuit 52, a motor, and a power supply switching apparatus 1 in the above embodiment.

As shown in FIG. 6, the power supply switching apparatus 1 establishes communication connections with the alternating-current power supply 2, the direct-current power supply 3, the energy storage power supply 4, and the frequency converter 5 to achieve the above power switching and fault detection functions, thereby achieving flexible power switching, reducing the possibility of a large fluctuation of the bus voltage in a short period of time during the power supply switching process, and making the multi-power supply system operate stably.

In some embodiments of the present disclosure, there is provided a computer-readable storage medium stored thereon a computer program that, when executed by a processor, implements the power supply switching method in the above embodiments.

The apparatus embodiments described above are only schematic, wherein the units described as separate components may or may not be physically separated, and the component illustrated as a unit may or may not be a physical unit, may be located in one place, or may be distributed on multiple network units. Some or all of the modules may be selected according to actual needs to implement the solution of this embodiment.

According to some embodiments of the present disclosure, there is provided a computer program, comprising: instructions that, when executed by a processor, cause the processor to perform the power supply switching method described above.

According to some embodiments of the present disclosure, there is provided a computer program product comprising instructions that, when executed by a processor, cause the processor to perform the power supply switching method described above.

Through the description of the above embodiments, those skilled in the art may clearly understand that each embodiment can be implemented by means of software and a necessary general hardware platform, or by hardware. Based on this understanding, a portion of the above technical solution that contributes to the related technology can be embodied in the form of a software product, wherein the computer software product is stored in a computer-readable storage medium, such as a ROM/RAM, a magnetic disk, or an optical disk, etc., comprising a number of instructions to cause a computer device (which may be a personal computer, a server, or a network device, etc.) to perform the methods described in the various embodiments or in some portions of the embodiments.

Finally, it should be noted that: the above embodiments are merely illustration of the technical solution of the present disclosure, but are not limitation thereof; although the present disclosure has been described in detail with reference to the above embodiment, those ordinary skilled in the art should understand: the technical solutions recited in the various embodiments described above may be modified or some technical features thereof may be substituted equivalently, such modifications or substitutions do not deviate the nature of the technique from the spirit and scope of the technique in the embodiments of the present disclosure.

What is claimed is:

1. A power supply switching method applied to a multi-power supply system, wherein the multi-power supply system comprises an alternating-current power supply, a direct-current power supply, and an energy storage power supply, and the method comprises:

obtaining a power supply switching instruction, wherein the power supply switching instruction comprises a power supply switching direction; and controlling, according to the power supply switching direction, the energy storage power supply to perform a voltage transition in a power supply switching process, wherein in a case where the power supply switching direction is switching from the alternating-current power supply to the direct-current power supply, the controlling of the energy storage power supply to perform the voltage transition in the power supply switching process comprises:

after obtaining the power supply switching instruction, controlling the energy storage power supply to be switched on and perform the voltage transition, comprising:

controlling the energy storage power supply to be switched on and controlling a power supply voltage of the energy storage power supply to be a first preset voltage, wherein the first preset voltage is less than a preset direct-current bus voltage; and controlling the power supply voltage output by the energy storage power supply to gradually increase to a second preset voltage according to a preset step, wherein the second preset voltage is greater than the preset direct-current bus voltage and less than a power supply voltage of the direct-current power supply.

2. The power supply switching method according to claim 1, wherein in a case where the power supply switching direction is switching from the alternating-current power supply to the direct-current power supply, the controlling of the energy storage power supply to perform the voltage transition in the power supply switching process further comprises:

after the voltage transition is completed, controlling the direct-current power supply to be switched on; and after continuing for a first preset duration, controlling the energy storage power supply to be switched off.

3. The power supply switching method according to claim 2, wherein:

the multi-power supply system further comprises a controlled rectifier circuit; and the method further comprises:

switching off a rectification control signal of the controlled rectifier circuit after controlling the energy storage power supply to be switched on and perform the voltage transition and after a second preset duration.

4. The power supply switching method according to claim 1, wherein in a case where the power supply switching direction is switching from the direct-current power supply to the alternating-current power supply, the controlling of the energy storage power supply to perform the voltage transition in the power supply switching process comprises:

after obtaining the power supply switching instruction, controlling the energy storage power supply to be switched on and controlling a power supply voltage of the energy storage power supply to be a third preset voltage, wherein the third preset voltage is less than a preset direct-current bus voltage;

after continuing for a third preset duration, controlling the direct-current power supply to be switched off and controlling the energy storage power supply to perform the voltage transition; and after completing a fourth preset duration of the voltage transition, controlling the energy storage power supply to be switched off.

5. The power supply switching method according to claim 4, wherein the controlling of the energy storage power supply to perform the voltage transition comprises:

controlling the power supply voltage of the energy storage power supply to gradually decrease to a fourth preset voltage according to a preset step, wherein the fourth preset voltage is greater than an uncontrolled rectification voltage value of the multi-power supply system, the uncontrolled rectification voltage value being an effective voltage value output by a controlled rectifier circuit in the multi-power supply system after a rectification control signal of the controlled rectifier circuit is switched off.

6. The power supply switching method according to claim 1, further comprising:

detecting whether the multi-power supply system has a fault before obtaining the power supply switching instruction;

in a case where the fault exists, entering a fault handling procedure; and in a case where the fault does not exist, controlling a predetermined power supply to be switched on and then triggering obtaining of the power supply switching instruction.

7. A power supply switching apparatus applied to a multi-power supply system, wherein the multi-power supply system comprises an alternating current power supply, a direct-current power supply, and an energy storage power supply, and the power supply switching apparatus comprises:

a memory; and a processor coupled to the memory, wherein the processor is configured to, based on instructions stored in the memory, obtain a power supply switching instruction, wherein the power supply switching instruction comprises a power supply switching direction, and control, according to the power supply switching direction, the energy storage power supply to perform a voltage transition in a power supply switching process, wherein in a case where the power supply switching direction is switching from the alternating current power supply to the direct-current power supply, the processor is configured to:

after obtaining the power supply switching instruction, control the energy storage power supply to be switched on and perform the voltage transition, which comprises:

control the energy storage power supply to be switched on and control a power supply voltage of the energy storage power supply to be a first preset voltage, wherein the first preset voltage is less than a preset direct-current bus voltage; and control the power supply voltage output by the energy storage power supply to gradually increase to a second preset voltage according to a preset step, wherein the second preset voltage is greater than the preset direct-current bus voltage and less than a power supply voltage of the direct-current power supply.

8. The power supply switching apparatus according to claim 7, wherein in a case where the power supply switching direction is switching from the alternating-current power supply to the direct-current power supply, the processor is further configured to:

after the voltage transition is completed, control the direct-current power supply to be switched on; and after continuing for a first preset duration, control the energy storage power supply to be switched off.

9. The power supply switching apparatus according to claim 8, wherein:

the multi-power supply system further comprises a controlled rectifier circuit; and the processor is further configured to switch off a rectification control signal of the controlled rectifier circuit after controlling the energy storage power supply to be switched on and perform the voltage transition and after a second preset duration.

10. The power supply switching apparatus according to claim 7, wherein in a case where the power supply switching direction is switching from the direct-current power supply to the alternating-current power supply, the processor is configured to:

after obtaining the power supply switching instruction, control the energy storage power supply to be switched on and control a power supply voltage of the energy storage power supply to be a third preset voltage, wherein the third preset voltage is less than a preset direct-current bus voltage;

after continuing for a third preset duration, control the direct-current power supply to be switched off and control the energy storage power supply to perform the voltage transition; and after completing a fourth preset duration of the voltage transition, control the energy storage power supply to be switched off.

11. The power supply switching apparatus according to claim 10, wherein the processor is configured to:

control the power supply voltage of the energy storage power supply to gradually decrease to a fourth preset voltage according to a preset step, wherein the fourth preset voltage is greater than an uncontrolled rectification voltage value of the multi-power supply system, the uncontrolled rectification voltage value being an effective voltage value output by a controlled rectifier circuit in the multi-power supply system after a rectification control signal of the controlled rectifier circuit is switched off.

12. A multi-power supply system, comprising an alternating-current power supply, a direct-current power supply, an energy storage power supply, and the power supply switching apparatus according to claim 7.

13. A non-transitory computer-readable storage medium stored thereon a computer program that, applied to a multi-power supply system, wherein the multi-power supply system comprises an alternating-current power supply, a direct-current power supply, and an energy storage power supply, when executed by a processor, cause the processor to:

obtain a power supply switching instruction, wherein the power supply switching instruction comprises a power supply switching direction; and control, according to the power supply switching direction, the energy storage power supply to perform a voltage transition in a power supply switching process, wherein in a case where the power supply switching direction is switching from the alternating-current power supply to the direct-current power supply, the computer program, when executed by the processor causes the processor to:

after obtaining the power supply switching instruction, control the energy storage power supply to be switched on and perform the voltage transition, which comprises:

control the energy storage power supply to be switched on and control a power supply voltage of the energy storage power supply to be a first preset voltage, wherein the first preset voltage is less than a preset direct-current bus voltage; and control the power supply voltage output by the energy storage power supply to gradually increase to a second preset voltage according to a preset step, wherein the second preset voltage is greater than the preset direct-current bus voltage and less than a power supply voltage of the direct-current power supply.

14. The non-transitory computer-readable storage medium according to claim 13, wherein in a case where the power supply switching direction is switching from the alternating-current power supply to the direct-current power supply, the computer program, when executed by the processor, cause the processor further to:

after the voltage transition is completed, control the direct-current power supply to be switched on; and after continuing for a first preset duration, control the energy storage power supply to be switched off.

15. The non-transitory computer-readable storage medium according to claim 14, wherein:

the multi-power supply system further comprises a controlled rectifier circuit; and the computer program, when executed by the processor, further cause the processor to:

switch off a rectification control signal of the controlled rectifier circuit after controlling the energy storage power supply to be switched on and perform the voltage transition and after a second preset duration.

16. The non-transitory computer-readable storage medium according to claim 13, wherein in a case where the power supply switching direction is switching from the direct-current power supply to the alternating-current power supply, the computer program, when executed by the processor, further cause the processor to:

after obtaining the power supply switching instruction, control the energy storage power supply to be switched on and control a power supply voltage of the energy storage power supply to be a third preset voltage, wherein the third preset voltage is less than a preset direct-current bus voltage;

after continuing for a third preset duration, control the direct-current power supply to be switched off and control the energy storage power supply to perform the voltage transition; and after completing a fourth preset duration of the voltage transition, control the energy storage power supply to be switched off.

17. The non-transitory computer-readable storage medium according to claim 16, wherein the computer program, when executed by the processor, further cause the processor to:

control the power supply voltage of the energy storage power supply to gradually decrease to a fourth preset voltage according to a preset step, wherein the fourth preset voltage is greater than an uncontrolled rectification voltage value of the multi-power supply system, the uncontrolled rectification voltage value being an effective voltage value output by a controlled rectifier circuit in the multi-power supply system after a rectification control signal of the controlled rectifier circuit is switched off.

* * * * *